US009047784B2

(12) United States Patent
Brownlow et al.

(10) Patent No.: US 9,047,784 B2
(45) Date of Patent: Jun. 2, 2015

(54) AUTOMATIC EBOOK READER AUGMENTATION

(75) Inventors: Sean T. Brownlow, Rochester, MN (US); Nathan G. Faiman, Rochester, MN (US); Michael T. Kalmbach, Elgin, MN (US); John E. Petri, St. Charles, MN (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/565,038

(22) Filed: Aug. 2, 2012

(65) Prior Publication Data

US 2014/0038154 A1 Feb. 6, 2014

(51) Int. Cl.
*G09B 5/06* (2006.01)

(52) U.S. Cl.
CPC ....................................... *G09B 5/06* (2013.01)

(58) Field of Classification Search
CPC ............ G09B 5/06; G09B 5/062; G09B 5/02; G09B 5/00; G06F 3/0483; G09G 2380/14; Y10S 345/901

USPC .......................................................... 434/317
See application file for complete search history.

(56) References Cited

U.S. PATENT DOCUMENTS

| 6,728,681 | B2 | 4/2004 | Whitham |
| 6,873,314 | B1 | 3/2005 | Campbell |
| 7,429,108 | B2 | 9/2008 | Rosenberg |
| 2002/0193996 | A1 | 12/2002 | Squibbs et al. |
| 2010/0145705 | A1 | 6/2010 | Kirkeby |
| 2011/0126119 | A1* | 5/2011 | Young et al. ................... 715/744 |
| 2012/0070805 | A1* | 3/2012 | Wong et al. .................... 434/114 |
| 2013/0209981 | A1* | 8/2013 | Newell ........................... 434/317 |

* cited by examiner

*Primary Examiner* — Peter Egloff
*Assistant Examiner* — Robert P Bullington
(74) *Attorney, Agent, or Firm* — Patterson & Sheridan, LLP

(57) ABSTRACT

Method, system, and computer program product for performing an operation for automatic electronic book augmentation. The operation presents an electronic book via a display screen of an electronic device, and identifies user preferences. The operation then determines a current reading position of a user within the electronic book. The operation then identifies, based on the user's current reading position, a context within the electronic book. The operation then identifies, based on the context and the user preferences, sensory effects to enhance the user's experience. The operation then outputs the sensory effects.

22 Claims, 6 Drawing Sheets

AUTOMATIC EBOOK READER AUGMENTATION

BACKGROUND

Embodiments disclosed herein relate to electronic book readers. Specifically, embodiments disclosed herein relate to providing context-appropriate effects to enhance a user's experience while reading electronic books on an electronic book reader.

Electronic book (eBook) readers are immensely popular, as they offer ease of use, storage of multiple books, text searching, Internet connectivity, dictionary searching, among other features. A user of an eBook reader simply needs to turn the device on, select an eBook, and begin reading. Additionally, an eBook reader may be used to play games, browse the internet, and perform many other functions.

SUMMARY

Embodiments disclosed herein provide a method, system, and computer program product for performing an operation for automatic electronic book augmentation. The operation presents an electronic book via a display screen of an electronic device, and identifies user preferences. The operation then determines a current reading position of a user within the electronic book. The operation then identifies, based on the user's current reading position, a context within the electronic book. The operation then identifies, based on the context and the user preferences, sensory effects to enhance the user's experience. The operation then outputs the sensory effects.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
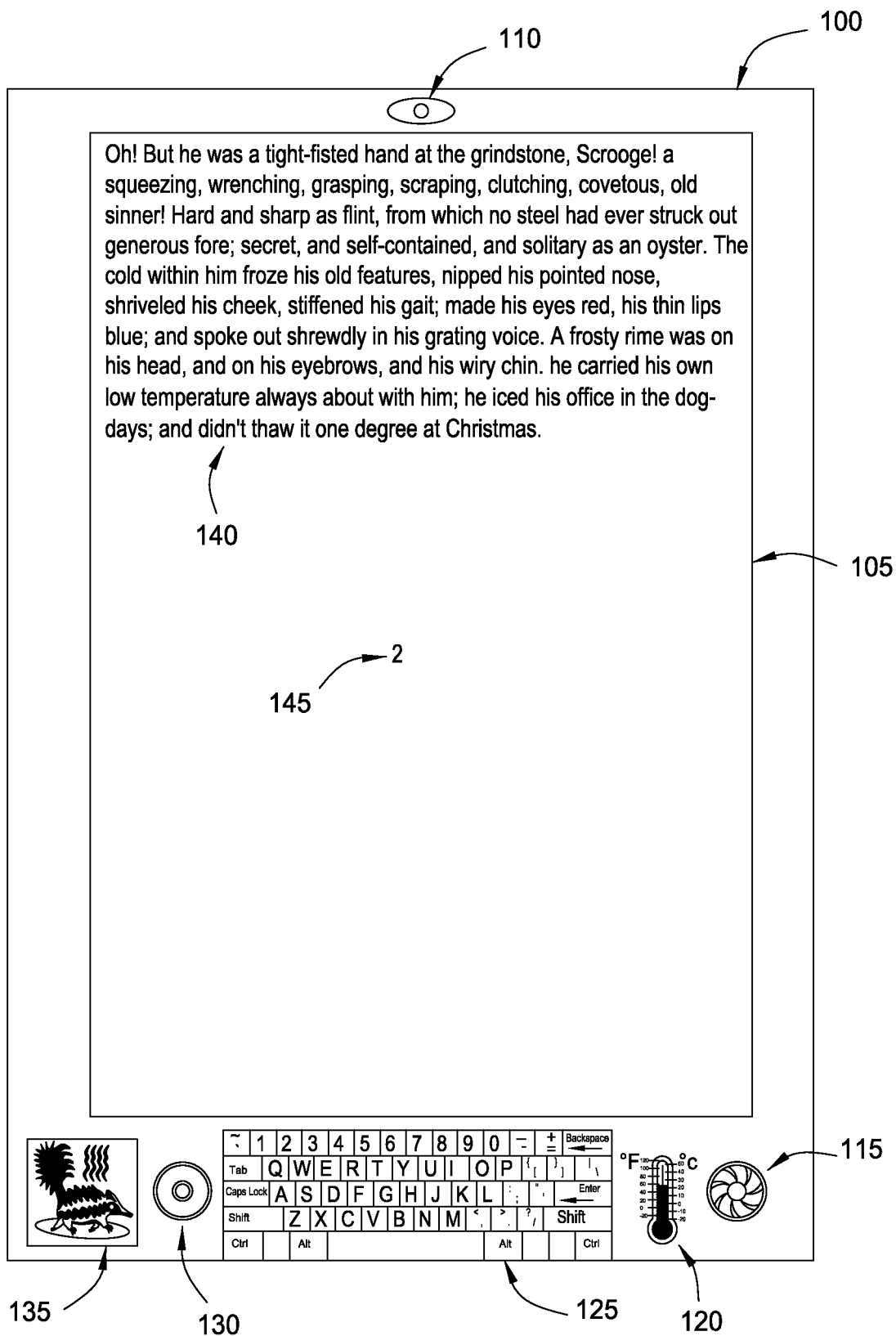
FIG. 1 is a diagram illustrating an electronic book reader, according to one embodiment disclosed herein.

Embodiments disclosed herein provide a method, system, and computer program product for performing an operation for automatic electronic book reader augmentation. The operation presents an electronic book via a display screen of an electronic device, and identifies user preferences. The operation then determines a current reading position of a user within the electronic book. The operation then identifies, based on the user's current reading position, a context within the electronic book. The operation then identifies, based on the context and the user preferences, sensory effects to enhance the user's experience. The operation then outputs the sensory effects.

Embodiments disclosed herein disclose techniques to augment an electronic book (eBook) with appropriate contextual effects without requiring any changes to the eBook itself. Effects include, but are not limited to audio (ambient noise, spoken text, and soundtracks), temperature changes, smells, wind, and vibrations that can enhance a user's reading experience when incorporated in the appropriate context. Embodiments disclosed herein provide these effects without needing the effects to be pre-programmed into the eBook to trigger their output.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram illustrating an electronic book reader (eReader) 100, according to one embodiment disclosed herein. The hardware components depicted in FIG. 1 are exemplary, as one of ordinary skill in the art would recognize that a variety of components may be included with an electronic book reader, and should not be considered limiting of the disclosure. As shown, the eReader 100 includes a display 105, which is used to output text, images, video, and a plurality of other types of content to the user. The eReader 100 also includes a camera 110, which, in the context of the present disclosure, is used to track the eye movement of the user in order to determine the user's current reading position. The eReader 100 also includes a fan 115, which may be used to blow air on the user, to, for example, create the effect of wind. The temperature unit 120 may be used to alter the temperature of the eReader 100, as well as change the temperature of the air emitted by the fan 115. The eReader 100 also includes a keyboard 125, which is used to accept user input. The eReader 100 also includes a speaker 130, which is used to output sounds to the user. Also shown is olfactory unit 135, which is configured to accept devices containing scents, which are emitted by the eReader 100 to create different smells for the user. Also shown in the display 105 is text 140, which is the text of an eBook loaded by a user into the eReader 100. Not pictured is a tactile feedback generator 150, which is configured to provide vibrations and other tactile feedback to a user. Position indicator 145 indicates to the user the current position within the book being displayed as text 140. The position indicator 145 may be a page of the book based on the formatting/font size, a percentage of the book that has been completed, or a location based on a character count.

Figure 2:
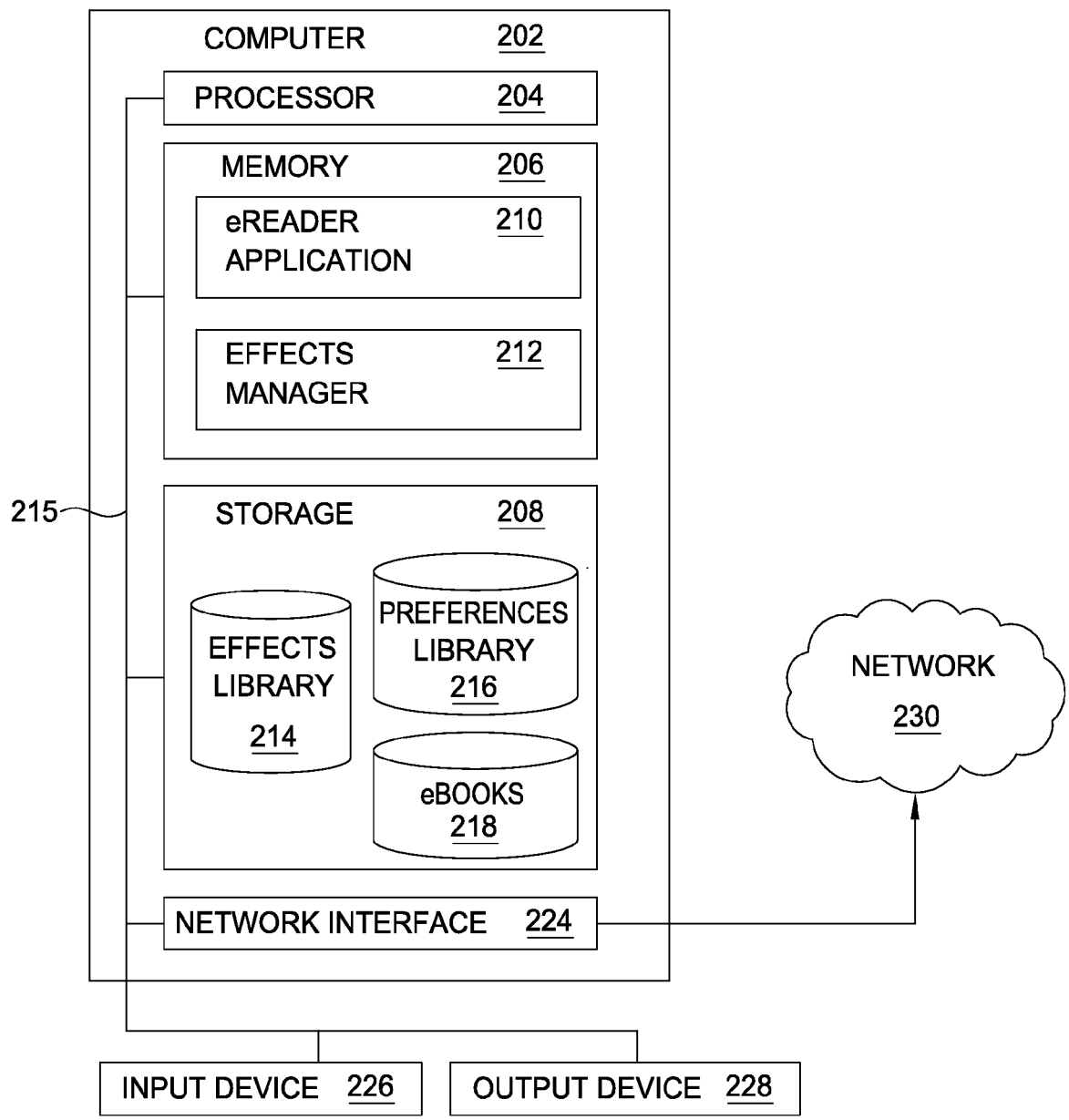
FIG. 2 is a block diagram illustrating a system for automatic eBook augmentation, according to one embodiment disclosed herein.

FIG. 2 is a block diagram illustrating a system 200 for automatic eBook augmentation, according to one embodiment disclosed herein. The system 200 includes a computer 202. In one embodiment, the computer 202 provides a detailed view of the eReader 100. The computer 202 is connected to a network 230, and may be connected to other computers via the network 230. In general, the network 230 may be a telecommunications network, a local area network (LAN), and/or a wide area network (WAN). In a particular embodiment, the network 230 is the Internet.

The computer 202 generally includes a processor 204 connected via a bus 215 to a memory 206, a network interface device 224, a storage 208, an input device 226, and an output device 228. The processor 204 is included to be representative of a single CPU, multiple CPUs, a single CPU having multiple processing cores, and the like. Similarly, the memory 206 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 224 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, floppy disc drives, tape drives, removable memory cards or optical storage. The memory 206 and the storage 208 may be part of one virtual address space spanning multiple primary and secondary storage devices.

The input device 226 may be any device for providing input to the computer 202. For example, a keyboard and/or a mouse may be used. In some embodiments, the computer 202 is an eBook reader, which has control buttons and other input devices 226 directly on its surface. The output device 228 may be any device for providing output to a user of the computer 202. For example, the output device 228 may be any conventional display screen or set of speakers. Although shown separately from the input device 226, the output device 228 and input device 226 may be combined. For example, a display screen with an integrated touch-screen may be used on an eBook reader.

As shown, the memory 206 of the computer 202 includes eReader application 210. The eReader application 210 is a general purpose application which in some embodiments may provide the operating system of the computer 202 and controls its overall functionality. In some embodiments, the eReader application 210 is the application which presents an eBook to a user using the computer 202. Also shown in the memory 206 is the effects manager 212. The effects manager 212 is an application configured to output additional effects through the computer 202 to enhance a user's reading experience. In some embodiments, the effects manager 212 is a component of the eReader application 210.

As shown, the storage 208 contains an effects library 214. The effects library 214 is a repository for effects, the format of which includes, but is not limited to audio, temperature changes, wind, vibration, and smells. The effects library 214, for each effect, may also store contextual and other associated data used to identify proper points at which to output the effects. As shown, the storage 208 also contains a preferences library 216. The preferences library 216 is used to store preferences of users of the computer 202. In some embodiments, the user data stored in the preferences library 216 may be for local users of the computer 202. In some embodiments, user data from other users may be stored on in the preferences library 216, and may include user data from the Internet. As shown, the storage 208 also contains eBooks 218. The eBooks 218 is a repository for the eBooks stored on the computer 202. Although depicted as a database, the effects library 214, preferences library 216, and eBooks 218 may take any format sufficient to store data. Although depicted as part of the computer 202, the effects library 214, preferences library 216, and eBooks 218 may be stored at a remote location and later accessed by the effects manager 212. In some embodiments, the effects library 214 may offer additional effects which are available for purchase. In these embodiments, a user of the eReader may decide to block the purchase of any such effects, choosing only royalty-free effects. In some embodiments, a publisher of the eBook may include its own effects which are stored in the effects library 214, and may configure the effects such that they may or may not be overridden by the user, depending on the service level agreement. In some embodiments, a user may generate his or her own effects, save them to the effects library 214, and share them with other users on the Internet.

Figure 3:
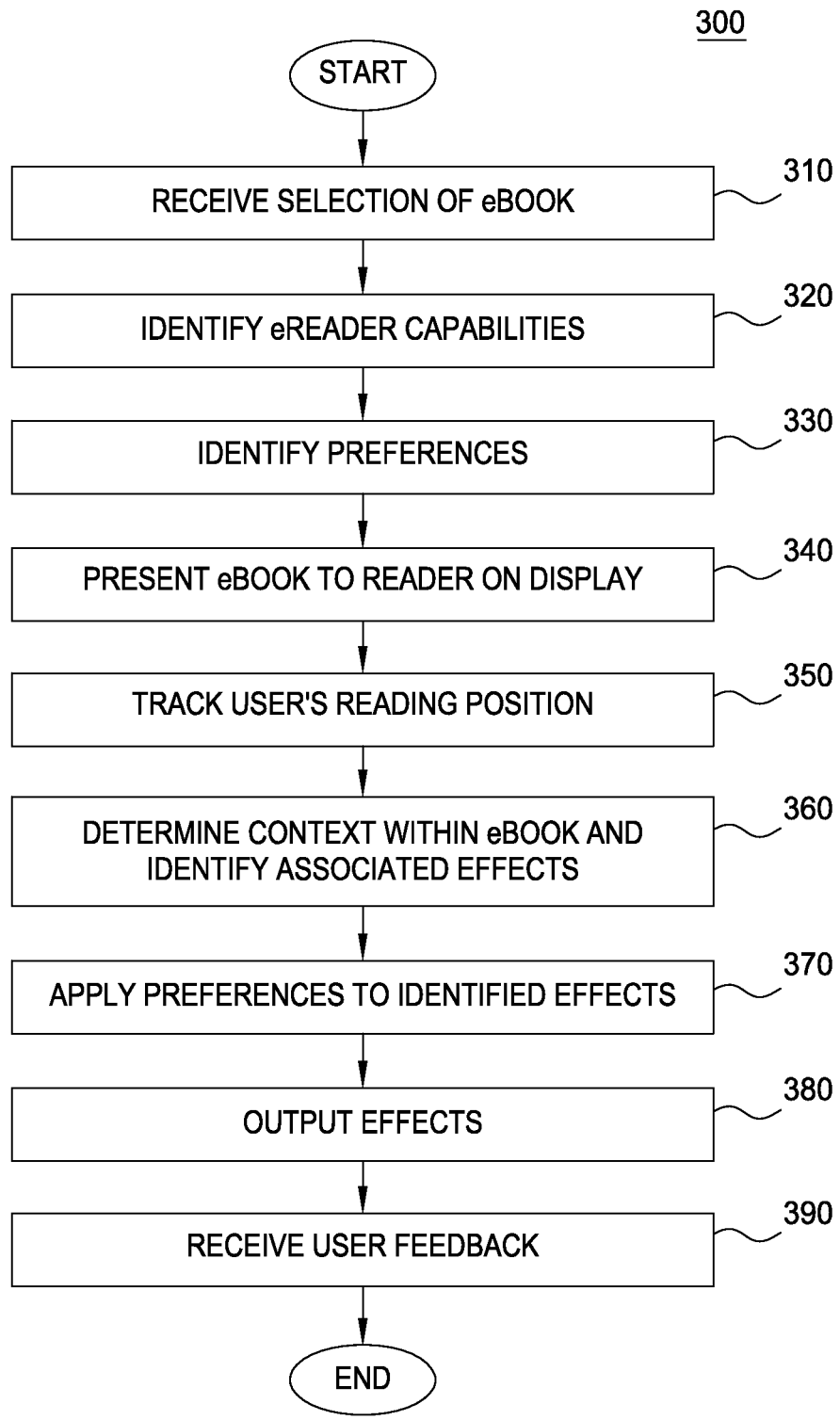
FIG. 3 is a flow chart depicting a method for automatic eBook augmentation, according to one embodiment disclosed herein.

FIG. 3 is a flow chart depicting a method 300 for automatic eBook augmentation, according to one embodiment disclosed herein. It should be recognized by one of ordinary skill in the art that the particular order of steps in the method 300 is just one embodiment, and any suitable order may be used to implement the functionality of the method 300. At step 310, the eReader application 210 receives a user selection of an eBook. In some embodiments, a user may select an eBook from the eBooks 218, or may obtain an eBook from an online source. At step 320, the capabilities of the eReader being used by the user are identified. In some embodiments, the effects manager 212 makes this determination. In identifying the capabilities of the user's eReader, the effects manager 212 may determine what additional effects may be outputted to the user based on the hardware the eReader contains. For example, if the eReader does not have a speaker, the effects manager 212 may disable all audio effects. If the eReader has a camera, then the effects manager 212 will be able to monitor the user's eye movements using appropriate eye tracking software to detect the user's reading position on a given page. In some embodiments, the eye tracking software may be part of the effects manager 212; in other embodiments, the eye tracking software may be a standalone module executing on the eReader. At step 330, the effects manager 212 identifies a set of preferences. The preferences are related to the user of the eReader, but may also include the preferences of other users, as described in further detail with reference to FIG. 4. The preferences may include, for example, a user's desire to disable all temperature effects, or limit audio effects to a certain specified class of audio (e.g., weather effects, spoken text, ambient noise, soundtracks). The preferences may also relate to a particular type of book, for example, a user may choose to not play sound effects for academic textbooks. At step 340, the eReader application 210 displays the eBook on the display 105 of the eReader 100, and the user begins reading the eBook.

At step 350, described in greater detail with reference to FIG. 5, the effects manager 212 tracks the user's reading position. The reading position may be based on the current position in the book, or by using eye tracking techniques if the eReader has a camera 110. At step 360, discussed in greater detail with reference to FIG. 6, the effects manager 212 determines a context within the eBook and identifies effects associated with the context. For example, if the user encounters a section of text where a character is walking through the woods at night, sound effects may be played which have been associated with animals. Thus, sounds of owls hooting, bats flying, and crickets chirping may be identified as relevant to the context of the character walking through the woods at night. At step 370, the effects manager applies the identified preferences to the identified effects. If the preferences override an identified effect, the identified effect is not output by the effects manager 212. The effects manager 212, in applying preferences, takes a number of factors into account, including context, user preferences, and online preferences. For example, although a particular sound may be associated with a specific context, the user may have overridden the sound with a different sound, and the custom sound will be played. At step 380, the effects manager 212 outputs effects to the user through the eReader hardware. At step 390, the effects manager receives user feedback related to the outputted effects, which indicate the user's level of satisfaction of the effects, including whether the effects were relevant. In some embodiments, the user feedback may be stored in the preferences library 216; in other embodiments, the user feedback may be stored in the effects library, and may be associated with the effect the user is providing feedback.

User feedback may be received by any input method sufficient to record user feedback, such as a feedback prompt which appears when an effect is presented. The effects manager 212 may also make decisions as to the duration of an effect. For example, a song may have a predefined time, which the effects manager 212 may play for the predefined amount of time. Other effects may play until another spot in the book is reached, or when the current context within the book has changed such that the effect is no longer relevant or necessary. The duration of different effects may be defined in the effects library 214.

Figure 4:
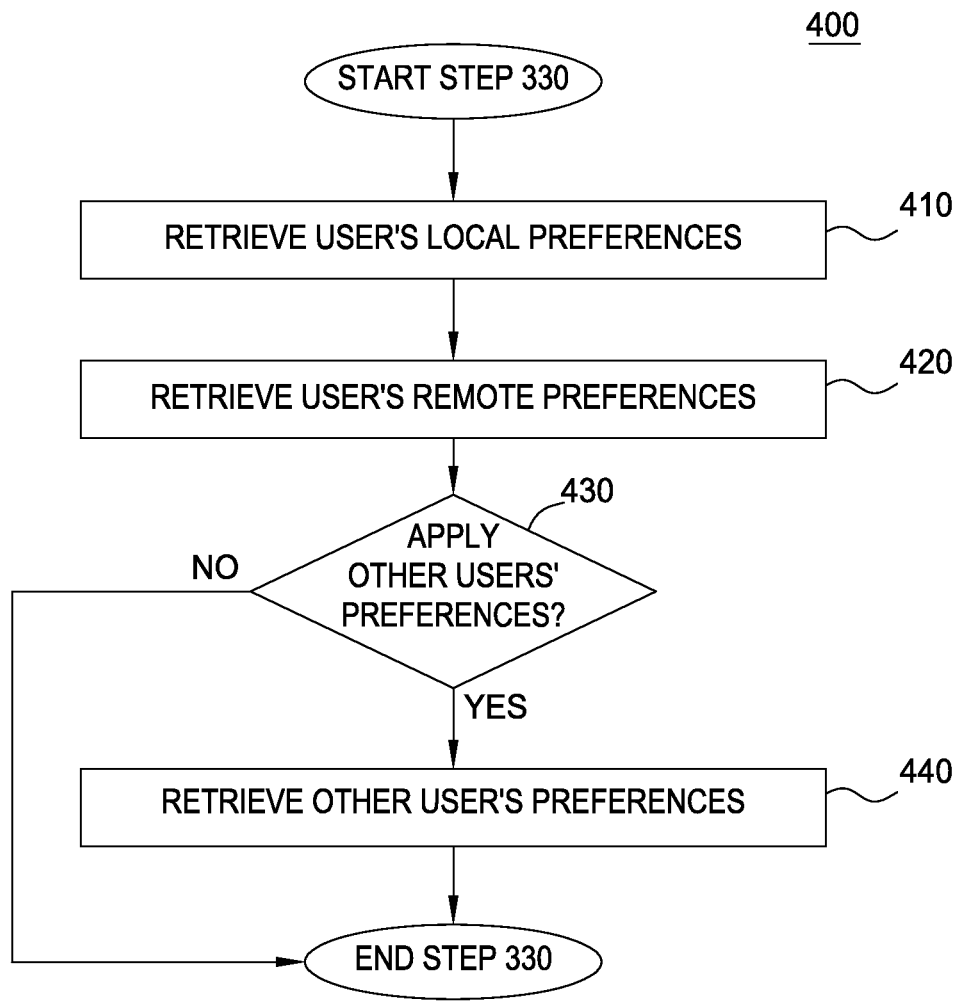
FIG. 4 is a flow chart depicting a method for identifying user preferences, according to one embodiment disclosed herein.

FIG. 4 is a flow chart depicting a method 400 corresponding to step 330 for identifying user preferences, according to one embodiment disclosed herein. In the illustrated embodiment, the effects manager 212 performs the steps of the method 400. In other embodiments, the eReader application 210 performs the steps of the method 400. At step 410, the effects manager 212 retrieves the user's local preferences from the preferences library 216. The preferences may include feedback previously compiled from the user. As discussed above, the preferences may be related to any number of configurable options. For example, a user's preferences may indicate that they only want audio from a particular artist played while reading poetry. The preferences may also indicate that a user only wants temperature effects outputted when reading historical fiction. As is recognized by one of ordinary skill in the art, the preferences a user may specify can be related to any configurable option, and the examples provided herein should not be considered limiting of the disclosure. At step 420, the effects manager 212 retrieves the user's remote preferences, if any have been stored at an external site. The effects manager 212, for example, may use the network interface 224 to connect to a preferences library stored on the Internet.

At step 430, the effects manager 212 determines whether the user wishes to include the preferences of other users. If the user preferences stored in the preferences library 216 indicates that the user is open to using the preferences of other users, the effects manager proceeds to step 440. The user may indicate a specific number of individuals from whom preferences should be retrieved, or the user may accept preferences from all users whose preferences have been stored. If the user has not indicated that they wish to use the preferences of other users, the method ends. At step 440, the effects manager 212 retrieves the preferences of other users. The preferences of other users may be stored in the preferences library 216, or may be stored on a remote storage location on the Internet. For example, the effects manager 212 may retrieve the preferences of a user's friends or family, which indicates particular effects to be used in conjunction with an eBook the user is reading. The effects manager 212 may also retrieve the most popular effects for the particular eBook which have been ranked as the most popular across all users on the Internet. For example, the user may have specified a preference to only use the most popular sound effect, spoken text, or music for a book or genre based on the preferences of all users. Thus, the effects manager 212 would retrieve the most popular effects from a remote location and store them in the effects library 216. Or, the user may specify a preference which requests that the effects manager 212 only play audio that the user's friends find appropriate for a given context. By retrieving user preferences, both personal to the user reading the current eBook as well as from other users, the effects manager 212 is able to make more intelligent decisions relating to which effects to output to the user. For example, although a particular context within an eBook matches a sound effect in the effects library 214, the user preferences may specify that the user has disabled sound effects for this particular eBook, and the effects manager 212 will not play the sound effect as a result. As another example, a user may prefer one artist's version of a song to another artist's version. The effects manager 212 may present the user with different versions of a song, from which the user can select a preferred version for playback during reading.

Figure 5:
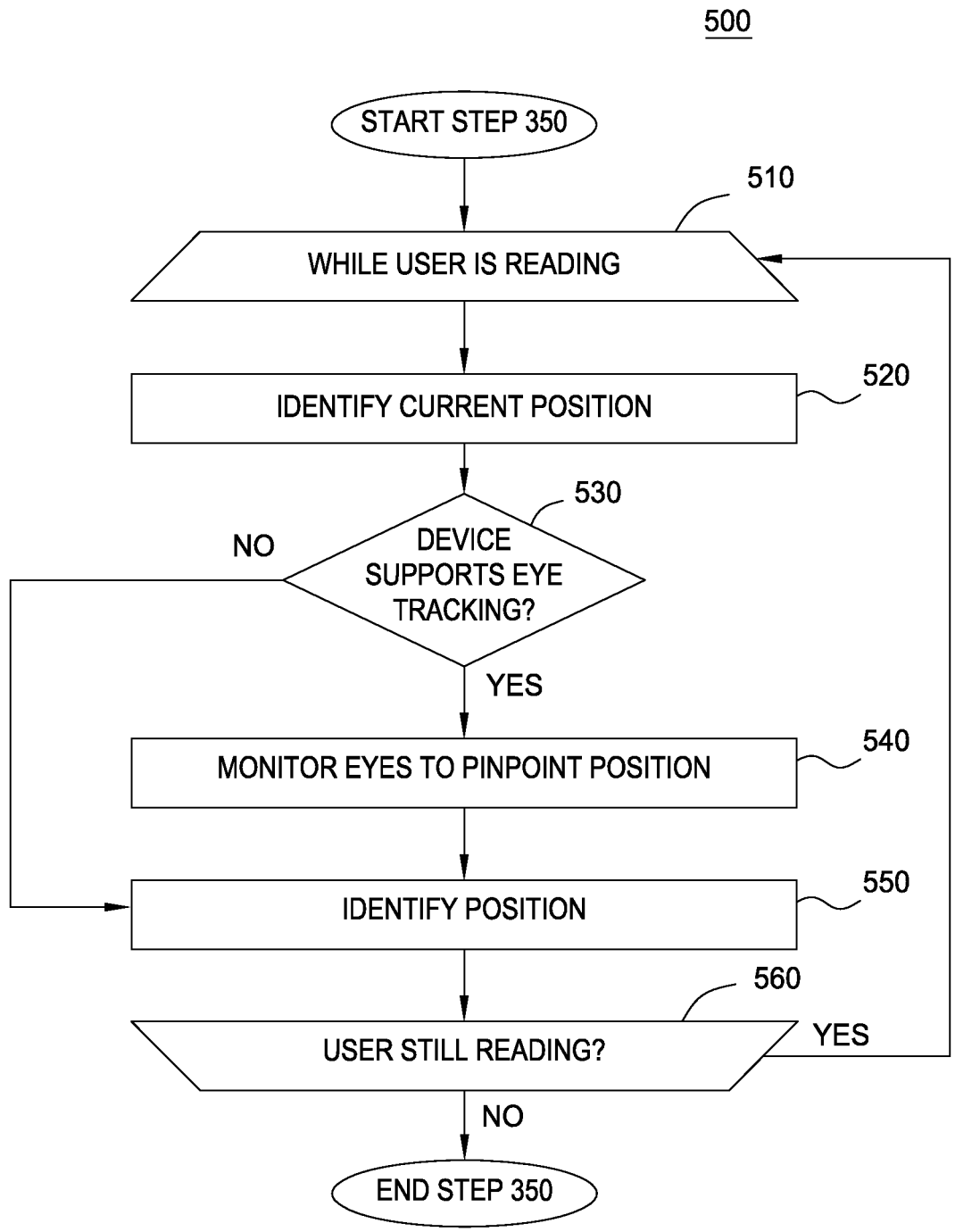
FIG. 5 is a flow chart depicting a method for tracking a user's reading position, according to one embodiment disclosed herein.

FIG. 5 is a flow chart depicting a method 500 corresponding to step 350 for tracking a user's reading position, according to one embodiment disclosed herein. In some embodiments, the effects manager 212 executes the steps of the method 500. At step 510, the effects manager executes a loop including steps 520-560 while the user is reading the eBook on the eReader. At step 520, the effects manager 212 determines the current position being displayed on the eReader. This provides an initial starting point for the effects manager 212 to determine the context which user is reading. At step 530, the effects manager 212 determines whether the eReader supports eye tracking. This determination may be made by referencing the eReader capabilities determined at step 320. If the eReader supports eye tracking, the effects manager 212 proceeds to step 540; otherwise, the effects manager 212 proceeds to step 550. At step 540, the effects manager 212 utilizes the camera 110 to monitor the user's eyes to determine where on the screen the user is looking. By tracing the user's eyes, the effects manager 212 is able to precisely determine where the user is reading and analyze the text in order to provide accurate effects based on the context at that precise location. By combining the context/location and eye tracking techniques, the effects manager 212 may provide the most realistic and accurate effects possible, as compared to simply using page numbers. In some embodiments, the effects manager 212, upon determining that the user is turning pages very quickly, or the user's eyes are moving very quickly, may scale back the outputting of effects, as it would appear that the user is skimming, or speed reading, and the outputting of effects would not be as appropriate. While skimming, the effects manager 212 may employ a summary mode where the user is given a general sense of the effects without outputting every single effect. For example, ambient noise may be played, but detailed effects such as spoken audio may be omitted while the user is skimming pages.

At step 550, the effects manager 212 identifies the user's current reading position. The effects manager 212 may make this determination based on the eye monitoring performed at step 540. If no eye monitoring capabilities are available, the effects manager 212 may specify the current position indicator 145 as the location. In some embodiments, the effects manager 212 may monitor the rate of page turns by the user in order to determine the user's location on the current position 145. For example, if the user has read 10 pages in 10 minutes, the effects manager may determine that the user reads at the rate of one page per minute. This information may be stored in the preferences library 216 or the effects library 214. Therefore, if the user has been on the current position 145 for 20 seconds, the effects manager 212 may estimate that the user is one third of the way through the current position 145. By making such calculations, the effects manager 212 may more accurately identify the user's current reading position. As one of ordinary skill in the art would recognize, at this point, the effects manager 212 may begin making determinations, based on the current reading position, of whether outputting effects would be appropriate given the current context of the eBook. This aspect of the disclosure is discussed in further detail with reference to FIG. 6. At step 560, the effects manager 212 determines whether the user is still reading. If the user is still reading, the effects manager 212 returns to step 510. Otherwise the method ends. In some embodiments, the effects manager 212 determines whether the user is still reading based on a predetermined amount of time having passed since the user last turned a page. In embodiments where eye tracking techniques are implemented, the effects manager 212 may determine that the user's eyes are no longer focused on the display 105, or that the user's eyes are no longer detected by the camera 110. Upon determining that the user is no longer reading the eBook, the effects manager 212 may continue outputting the effects currently being outputted, or it may stop outputting some, or all of the effects. Additionally, the effects manager 212 may "nudge" an inattentive user to recapture their attention, for example, in an education setting, by vibrating the eReader via the tactile feedback generator 150. In some embodiments a user may set a timeout preference, the expiration of which will cause the effects manager 212 to stop outputting effects.

Figure 6:
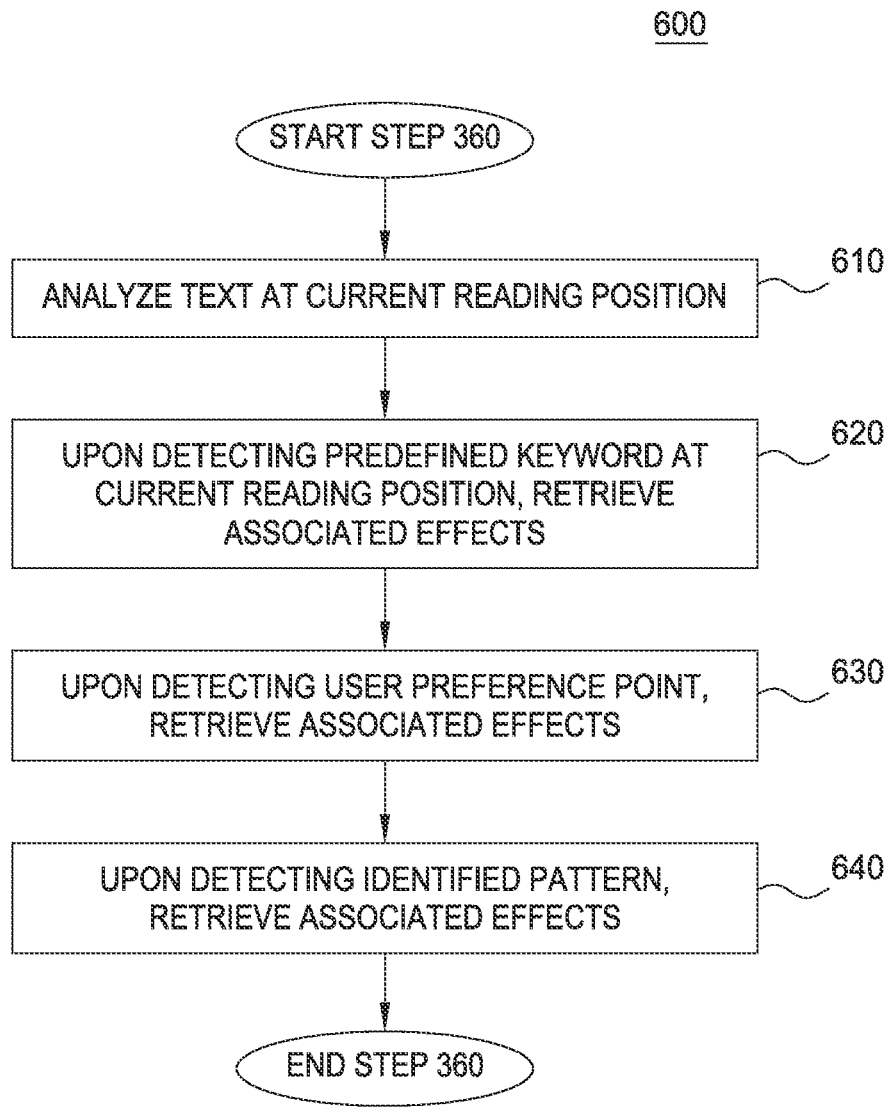
FIG. 6 is a flow chart depicting a method for determining a context within an eBook and associated effects, according to one embodiment disclosed herein.

FIG. 6 is a flow chart depicting a method 600 corresponding to step 360 for determining a context within an eBook and identifying associated effects, according to one embodiment disclosed herein. In some embodiments, the effects manager 212 performs the steps of the method 600. Although depicted as a flow chart, the effects manager 212 need not perform each step of the method to determine the context within the eBook and identify associated effects. At step 610, the effects manager 212 analyzes the eBook text at the user's current reading position using text analytics and natural language processing techniques. By analyzing the text, the effects manager 212 may identify the context in which different words appear in the text, and make intelligent selections as to which effects to output to the user. For example, the effects manager 212 may encounter the word "cold," which may refer to the current temperature, or may refer to a person having an illness. By analyzing the surrounding text, the effects manager 212 may emit cool air from the fan 115 if the context is the current weather, or may play sounds through the speaker 130 of a person coughing and sneezing if the context is an illness. At step 620, the effects manager, upon detecting a predefined context at the current reading position, retrieves effects associated with the context in the effects library 214. In one embodiment, the current context is a keyword. In some embodiments, the contexts are predefined by the effects manager 212. In other embodiments, users may define contexts and associate effects with the contexts. The context is used by the effects manager 212 as a trigger point to determine that a particular context of the eBook has been identified, and that an associated effect may be retrieved for output. In some embodiments, the effects manager 212 retrieves the associated effects upon determining that the user's current reading position is within a predefined range of the context. For example, the predefined range may be the same paragraph, page, line, or sentence of the current reading position. At step 630, the effects manager 212, upon detecting a user preference point, retrieves associated effects. For example, the user may have specified that on each page turn in a mystery or horror novel, a creaking door sound may be played. Thus, if the effects manager 212 determines that the user is turning the page, the effects manager 212 will retrieve the associated effect from the effects library 214. At step 640, the effects manager 212, upon detecting an identified pattern, retrieves associated effects from the effects library 214. The pattern may take any form, such as preferences from online sources, such as social networking, web user profiles, and the like. For example, if the effects manager 212 determines that users across the Internet have provided strong feedback for emitting a smell of wildflowers while a character walks through a field, the effects manager 212 may emit the wildflower smell when the user encounters a similar context.

Additionally, the effects manager 212 may use user feedback to determine if an outputted effect was appropriate for a given context. For example, although text analysis may conclude that a character is walking through a forest, the user can tell effects manager 212 to override a chosen augmentation for that text. Over time, the combined feedback from users is used to automatically filter out inappropriate augmentations when it encounters similar contexts. In addition, the effects manager 212 detects when the user scans or skims texts with their eyes. In such a case, the effects manager 212 may provide effects as the user scans/skims text or turns off some or all effects until the user begins normal reading again.

Embodiments disclosed herein use eye tracking, text analysis, service level agreements, and supplemental Internet searching to automatically discover appropriate effects for any eBook. The format and content of the eBook itself need not be changed in any way to support such augmentation. Text analytic techniques are used to understand the meaning and context from the book's text. This meaning and context is then used in selecting appropriate effects and provide the reader with additional options.

In addition, the presentation of effects disclosed herein is not limited to reading material being presented through an eBook reader. As modern eBook readers now play games, provide web browsing capabilities, and other applications, the effects may be presented in those applications as well. For example, users can define music to be played during segments of a video game. Eye monitoring and text analytic techniques may be used while a user is reading a web page to provide effects similar to those described above in the eBook context. Advantageously, the presentation of effects described herein may be utilized in nearly any application executed by an eBook reader.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to provide additional sensory effects to users reading electronic books, comprising:
presenting an electronic book via a display screen of an electronic device;
identifying user preferences;
determining a current reading position of a user within the electronic book;
identifying, based on the current reading position, a context within the electronic book, wherein the context comprises a predefined keyword;
identifying, based on the context and the user preferences, a sensory effect, wherein the sensory effect comprises a temperature of an airflow outputted via a fan of the electronic device, wherein a temperature of the airflow is controlled by a temperature unit of the electronic device; and
outputting the sensory effect via the electronic device.

2. The method of claim 1, wherein determining the current reading position comprises one of: (i) tracking eye movement of a user, and (ii) monitoring the rate of page turns.

3. The method of claim 1, further comprising identifying preferences of a plurality of different users, wherein identifying the sensory effect is further based on preferences of the plurality of different users.

4. The method of claim 1, wherein the sensory effect is identified based upon the current reading position being within a specified range of the predefined keyword in the electronic book text.

5. The method of claim 1, further comprising:
identifying, based on the context and the user preferences, a plurality of sensory effects; and
outputting the plurality of sensory effects, wherein each sensory effect of the plurality of sensory effects further comprises one or more of:
a sound in an effects library outputted by a speaker of the electronic device;
a vibration outputted by a tactile unit of the electronic device;
a smell outputted by an olfactory unit of the electronic device;
a temperature of the electronic device controlled by the temperature unit of the electronic device; and
tactile feedback outputted by a tactile feedback generator of the electronic device.

6. The method of claim 1, wherein the sensory effect comprises a predefined sensory effect of the electronic book; wherein the sensory effect is not outputted to a user who is skimming pages; wherein the user disables the output of the sensory effect; wherein the user provides feedback related to the outputted sensory effect; wherein the output of the sensory effect is halted when the user stops reading.

7. A computer program product to provide additional sensory effects to users reading electronic books, comprising:
a non-transitory computer-readable storage medium having computer-readable program code embodied therewith, the computer-readable program code comprising:
computer-readable program code configured to present an electronic book via a display screen of an electronic device
computer-readable program code configured to identify user preferences;
computer-readable program code configured to determine a current reading position of a user within the electronic book;
computer-readable program code configured to identify, based on the current reading position, a context within the electronic book, wherein the context comprises a predefined keyword;
computer-readable program code configured to identify, based on the context and the user preferences, a sensory effect, wherein the sensory effect comprises a temperature of an airflow outputted via a fan of the electronic device, wherein a temperature of the airflow is controlled by a temperature unit of the electronic device; and
computer-readable program code configured to output the two or more sensory effects via the electronic device.

8. The computer program product of claim 7, wherein determining the current reading position comprises one of: (i) tracking eye movement of a user, and (ii) monitoring the rate of page turns.

9. The computer program product of claim 7, further comprising identifying preferences of a plurality of different users, wherein identifying the sensory effect is further based on preferences of the plurality of different users.

10. The computer program product of claim 7, wherein the sensory effect is identified based upon the current reading position being within a specified range of the predefined keyword in the electronic book text.

11. The computer program product of claim 7, further comprising:
computer-readable program code configured to identify a plurality of sensory effects; and
computer-readable program code configured to output the plurality of sensory effects, wherein each sensory effect of the plurality of sensory effects further comprises one or more of:
a sound in an effects library outputted by a speaker of the electronic device;
a vibration outputted by a tactile unit of the electronic device;
a smell outputted by an olfactory unit of the electronic device;
a temperature of the electronic device controlled by the temperature unit of the electronic device; and
and tactile feedback outputted by a tactile feedback generator of the electronic device.

12. The computer program product of claim 7, wherein the sensory effect comprises a predefined sensory effect of the electronic book; wherein the sensory effect is not outputted to a user who is skimming pages; wherein the user disables the output of the sensory effect; wherein the user provides feedback related to the outputted sensory effect; wherein the output of the sensory effect is halted when the user stops reading.

13. A system, comprising:
one or more computer processors;
a memory containing a program, which when executed by the one or more computer processors is configured to perform an operation to provide additional sensory effects to users reading electronic books, the operation comprising:
presenting an electronic book via a display screen of an electronic device;
identifying user preferences;
determining a current reading position of a user within the electronic book;
identifying, based on the current reading position, a context within the electronic book, wherein the context comprises a predefined keyword;
identifying, based on the context and the user preferences, a sensory effect, wherein the sensory effect comprises a temperature of an airflow outputted via a fan of the electronic device, wherein a temperature of the airflow is controlled by a temperature unit of the electronic device; and
outputting the sensory effect via the electronic device.

14. The system of claim 13, wherein determining the current reading position comprises one of: (i) tracking eye movement of a user, and (ii) monitoring the rate of page turns.

15. The system of claim 13, further comprising identifying preferences of a plurality of different users, wherein identifying the sensory effect is further based on preferences of the plurality of different users.

16. The system of claim 13, wherein the sensory effect is identified based upon the current reading position being within a specified range of the predefined keyword in the electronic book text.

17. The system of claim 13, the operation further comprising:
identifying, based on the context and the user preferences, a plurality of sensory effects; and outputting the plurality of sensory effects, wherein each sensory effect of the plurality of sensory effects further comprises one or more of:
- a sound in an effects library outputted by a speaker of the electronic device;
- a vibration outputted by a tactile unit of the electronic device;
- a smell outputted by an olfactory unit of the electronic device;
- a temperature of the electronic device controlled by the temperature unit of the electronic device; and
- tactile feedback outputted by a tactile feedback generator of the electronic device.

18. The system of claim 13, wherein the sensory effect comprises a predefined sensory effect of the electronic book; wherein the sensory effect is not outputted to a user who is skimming pages; wherein the user disables the output of the sensory effect; wherein the user provides feedback related to the outputted sensory effect; wherein the output of the sensory effect is halted when the user stops reading.

19. The method of claim 1, wherein the context is identified at least in part on analytics and natural language processing performed on a text of the electronic book near the current reading position, wherein the context specifies a meaning of the electronic book at the current reading position, wherein sensory effect is identified based on the context and the user preferences.

20. The method of claim 1, wherein the sensory effect is further identified based on: (i) preferences of a plurality of different users using different electronic devices, (ii) the current reading position being within a specified range of a predefined keyword in the electronic book text, (iii) feedback for each of the sensory effects received from the plurality of different users, and (iv) a popularity of each of the sensory effects, wherein the current reading position is determined based on: (i) tracking eye movement of a user, and (ii) computing a rate of page turns of the user.

21. The method of claim 20, wherein outputting of the sensory effect is stopped upon determining at least one of: (i) that the rate of page turns indicates that the user is skimming the electronic book, (ii) that the eyes of the user are not focused on the electronic device, (iii) that a predefined period of time has elapsed since the user last turned a page of the electronic book.

22. The method of claim 21, further comprising:
- upon determining that the sensory effect is inappropriate for the identified context, identifying a second sensory effect of a second format for the identified context, wherein the first sensory effect is determined to be inappropriate based on aggregated feedback received from a plurality of users.

* * * * *